United States Patent
Llorente González et al.

(10) Patent No.: US 8,096,778 B2
(45) Date of Patent: Jan. 17, 2012

(54) STRUCTURAL BEAM FOR A WIND GENERATOR BLADE PRODUCTION METHOD THEREOF

(75) Inventors: José Ignacio Llorente González, Pamplona (ES); Sergio Vélez Oria, Pamplona (ES)

(73) Assignee: Gamesa Innovation & Technology, S.L., Pamplona (ES)

( * ) Notice: Subject to any disclaimer, the term of this patent is extended or adjusted under 35 U.S.C. 154(b) by 953 days.

(21) Appl. No.: 11/662,850

(22) PCT Filed: Sep. 14, 2005

(86) PCT No.: PCT/ES2005/000496
§ 371 (c)(1),
(2), (4) Date: Apr. 8, 2008

(87) PCT Pub. No.: WO2006/035088
PCT Pub. Date: Apr. 6, 2006

(65) Prior Publication Data
US 2008/0310964 A1    Dec. 18, 2008

(30) Foreign Application Priority Data
Sep. 14, 2004    (ES) .................................. 200402191

(51) Int. Cl.
*F01D 5/14*    (2006.01)

(52) U.S. Cl. .................... 416/226; 416/241 A; 264/257; 264/258

(58) Field of Classification Search ................. 416/226, 416/234, 239
See application file for complete search history.

(56) References Cited

U.S. PATENT DOCUMENTS

| | | | | |
|---|---|---|---|---|
| 2,506,992 | A * | 5/1950 | Bucher et al. | 416/226 |
| 3,691,000 | A * | 9/1972 | Kalnin | 428/114 |
| 4,728,263 | A * | 3/1988 | Basso | 416/226 |
| 4,909,872 | A * | 3/1990 | Jarmon | 156/89.25 |
| 5,632,602 | A * | 5/1997 | Herrmann et al. | 416/226 |

* cited by examiner

*Primary Examiner* — Edward Look
*Assistant Examiner* — Ryan Ellis
(74) *Attorney, Agent, or Firm* — Ladas & Parry LLP

(57) ABSTRACT

Structural beam of a wind turbine blade comprising a body-root and a body-trunk in the form of a box with a section decreasing towards the blade tip, comprising various piles each formed by various layers of carbon fiber impregnated with a synthetic resin, located on the upper and lower areas, intercalated between various layers of fiber glass impregnated with synthetic resin arranged along its perimeter, including between two piles, at least one layer of reinforcing material on each of the side areas enveloped by an adhesive resin film. The invention also comprises a procedure for the manufacture of the structural beam which, amongst other stages, includes the application of the layers mentioned onto a mold and the beam curing process.

10 Claims, 5 Drawing Sheets

STRUCTURAL BEAM FOR A WIND GENERATOR BLADE PRODUCTION METHOD THEREOF

FIELD OF THE INVENTION

This invention relates to a structural beam manufactured in composite material, based on fibre glass, carbon fibre and synthetic resin and in particular to the structural beam of a wind turbine blade and the manufacturing process of said beam.

BACKGROUND OF THE INVENTION

The structural components of wind turbine blades must be designed to support the stresses caused by their continuous working conditions, and to weigh as little as possible. This is why composite materials have been used for their manufacture.

However, wind turbine blades with a structural component specifically designed to be the subject of an efficient mechanised manufacturing process are not known. In this regard, antecedents in the aeronautics sector are known, such as those mentioned below.

Document PCT WO 84/04905 describes a manufacturing process for covering an aeroplane wing in a composite material, in which the demoulding is carried out by applying pneumatic pressure to air bags provided for this purpose, with the final covering being formed after being cured at temperature. The complexity of this process and the control necessary for the application of pneumatic pressure on the mould are resolved with this invention, as will be shown herein.

Document PCT WO 96/06776 describes a manufacturing process for forming a composite material covering for the rotor blade of a helicopter. In this process the demoulding is also performed by applying pressure on an inflatable mandrel.

Document U.S. Pat. No. 5,632,602 describes the process followed for the fibre reinforced synthetic resin covering of a rotor blade. This process is performed by direct lamination without demoulding.

Document JP 6074142 similarly describes a manual method of winding fibre and resin on a beam element, in order to reinforce its longitudinal resistance.

Finally, document U.S. Pat. No. 4,273,601 describes a method of winding reinforced resin with fibre filaments, without a demoulding process.

DESCRIPTION OF THE INVENTION

Firstly, this invention proposes a specific design of the structural beam of a wind turbine blade, and secondly, a manufacturing procedure for said blade which is susceptible to mechanisation with a high degree of automation.

The structural beam proposed is formed, as is the known technique, by a first body or root body with a first cylindrical shaped part close to the wind turbine hub, a third box shaped part and a second part with a transitional shape, and a second body, which further will be referred to as body-trunk.

According to this invention, in its first point, this body-trunk which is shaped in the form of a box with a decreasing section towards the blade tip comprises various piles, each formed by various layers of carbon fibre impregnated with a synthetic resin, located on the upper and lower areas, intercalated between various layers of fibre glass impregnated with synthetic resin arranged along its perimeter, also including a layer of reinforcing material on each of the side areas and a resin film which envelopes the above group.

According to the invention, in it's second point, the manufacturing process of this beam comprises the following stages:

a) Preparation of a mould with the hollow beam shape, provided with the means to facilitate the following operations:

b) Introduction of the body-root into the mould c) Successive application on the mould area of the body-trunk of:
  various layers of fibre glass impregnated with synthetic resin to cover, as with a bandage, the complete mould surface, forming an initial layer upon which the carbon will later be applied.
  various layers of carbon fibre impregnated with synthetic resin on the upper part of the mould,
  various layers of fibre glass impregnated with synthetic resin to cover, as with a bandage, the complete mould surface, while avoiding that the layers of carbon become unstuck and fall when later turned;

d) 180° turn of the mould;

e) Repetition of step c) with the bottom side of the mould;

f) Application of a layer of reinforcing material to each of the side areas of the mould, prior to placement in these areas of several resin sheets to fix them vertically, and later wrapping with an adhesive resin film;

g) Repetition of steps c) and e) numerous times;

h) Curing the beam by applying hot air flow to the external surface of the beam and to the inside of the mould;

i) Cooling to demoulding temperature, demoulding and cooling the beam to room temperature.

This manufacturing process, as will be seen in more detail, allows the application of the layers of composite materials mentioned to be performed by specialised machines, such as fibre glass winding machines and automatic taping machines for carbon fibre material.

Other characteristics and advantages of this invention become apparent in the detailed description and the accompanying figures that follow.

DETAILED DESCRIPTION OF THE INVENTION

Figure 1:
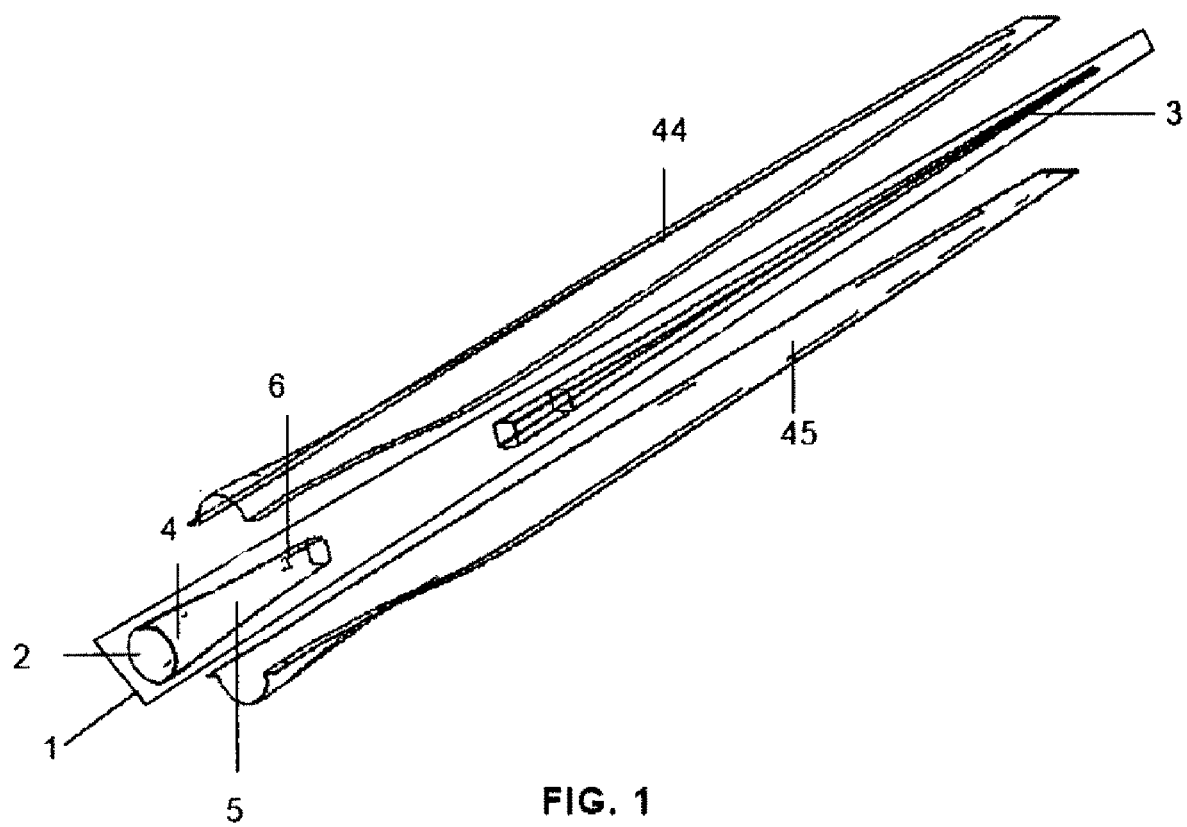
FIG. 1 shows a sketch of the different parts which comprise a wind turbine blade.
Figure 2:
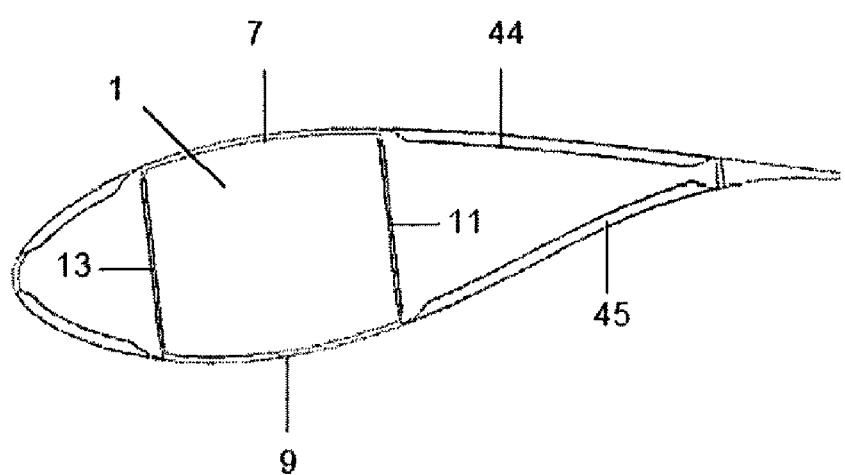
FIG. 2 shows a lengthways cross section of a wind turbine blade.

As shown in FIGS. 1 and 2, a wind turbine blade known in the technique is made up of a structural beam 1, an upper shell or extrados 44 and a lower shell or intrados 45.

The structural beam 1 is formed by a first body or body-root 2 and a second body or body-trunk 3.

The body-root 2 is formed by a cylinder shaped first part 4, a second transition part 5 and a third box shaped part 6.

The body-trunk 3 is box shaped with a decreasing section towards the blade tip, having to support its upper side 7, which is in contact with the extrados 44, and its lower side 9, which is in contact with the intrados 45, severe stresses to the side faces 11 and 13, during the blade's useful life.

Figure 3:
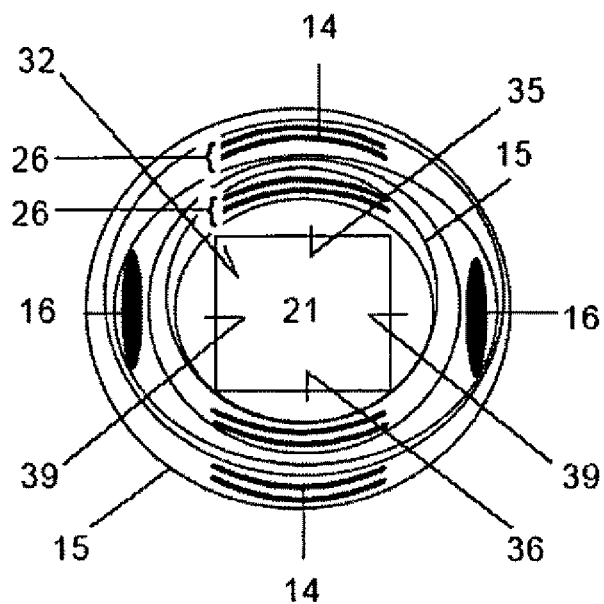
FIG. 3 shows a sketch of the configuration of the structural beam of the wind turbine blade according to this invention.

According to this invention, the structural beam 1 is formed by a body-root 2 structured in an appropriate way in order to meet the functions for fixing the blade to the wind turbine hub and for supporting and transmitting the maximum loads to which the blade is subjected by the wind, and by a body-trunk 3 which comprises, as shown in FIG. 3, various piles 26 each formed by layers of carbon fibre impregnated with synthetic resin 14 located on the upper areas 7 and lower areas 9 of the beam, intercalated between various layers of fibre glass impregnated with synthetic resin 15 arranged along all of the beam's surface, and by a layer of reinforcing material 16 on each side of the beam, with these reinforcing layers being vertically fixed to the beam by resin sheets, and later being covered with an adhesive resin film.

We now move on to describe the main stages which make up the procedure, according to the embodiment of this invention, for the manufacture of said structural beam.

1. Preparation of the Mould and Introduction of the Body-Root.

Figure 5:
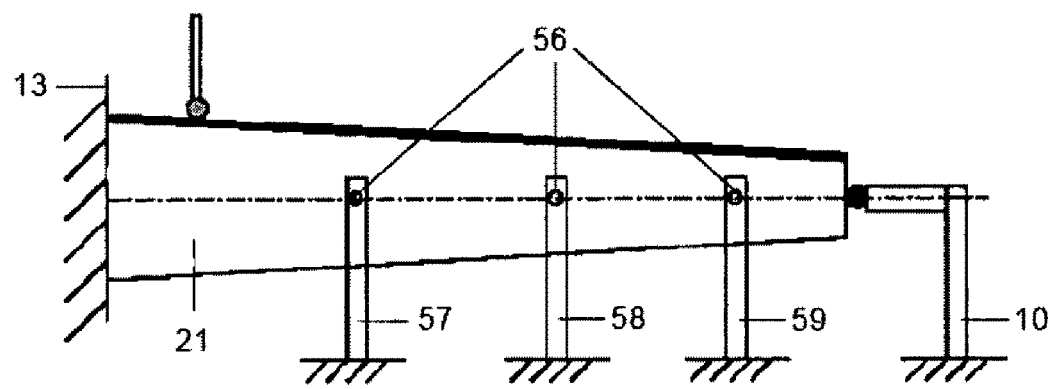
FIG. 5 shows a sketch of the mould used in the performance of the manufacturing process of the structural beam of a wind turbine blade according to this invention.

In this first part of the process the surface of the mould 21 shown in FIG. 5 is prepared, this will be used to manufacture the beam 1 with a treatment of demoulding liquids which will facilitate the later operation of extracting the beam 1. After this operation, some fixing elements 56 are placed which will serve as a connection with the support systems 57, 58 and 59 of the mould 21. These support systems are of the retractable type which allow the passage of a winding machine 47 during the winding process, as explained later. In the laminating position mould 21 is supported at the ends, using an articulated support 10 and a built in support 13, both of which allow the mould to turn axially. The mould 21 is supported by supports 57, 58 and 59 using articulated supports.

Once the mould 21 is prepared, the body 2 is inserted into the end 13, and it is fixed using a screwed joint with metal inserts threaded to element 18, which will be used for the demoulding operation at the end of the process.

2. Lamination Process

In this stage, the beam 3 is laminated, i.e. successive layers of carbon fibre and resin, 14, and layers of fibre glass and resin, 15, are applied.

In order to laminate the beam 3, the mould 21 must be resting on the three retractable supports 57, 58 and 59, and be supported at the tip by a support called a boom, 10, as shown in FIG. 5.

Figure 6:
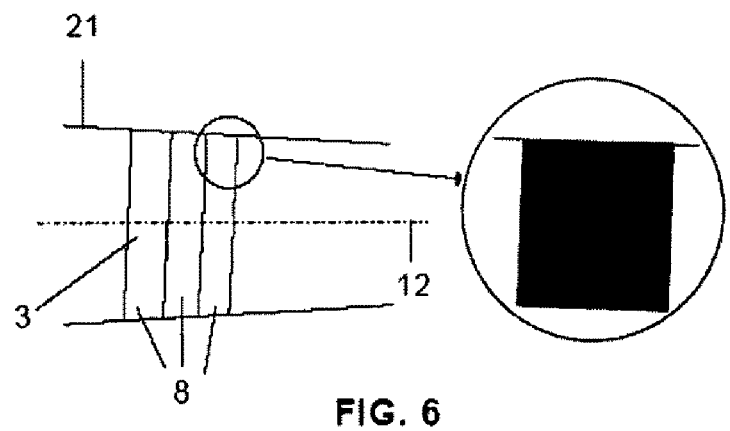
FIG. 6 shows the configuration of the fibre glass fabrics applied to the mould.

The beginning of the lamination process consists of winding various layers of fibre glass 15 over the mould 21 in the above position, using a winding machine 47, which has side panels for protection 20. As shown in FIG. 6, the layers are formed by fabrics 8, overlapping each other lengthways, by between 10 and 20 mm, with the fibre glass angled at approximately +/−45° in relation to the shaft 12 of the beam 3.

Figure 7:
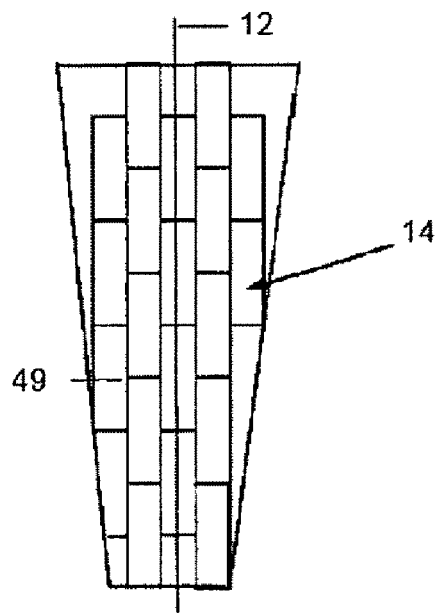
FIG. 7 shows the configuration of the carbon fibre fabrics laminated on the upper and lower ends of the mould.

Then, on the upper surface 35 of the mould 21 layers of carbon fibre 14 are laminated using an automatic tape laminator 24 with a taping head 22 and fed by a carbon deposit 23, until it reaches the connection radius 37 for the side parts 39 of the mould 21. As shown in FIG. 7, the layers 14 are formed by fabrics 49 which do not overlap each other.

Then, a second layer of carbon fibre and resin is wound over the carbon laminates using a winding machine 47.

The pile 26 comprises the three aforementioned steps, i.e. winding the fibre glass layers, laminating the carbon fibre layers, and winding the fibre glass layers and resin for a second time.

After this process, the supports 57, 58 and 59 are removed, and the mould 21 is turned 180°, the supports are then replaced and another pile 26 is placed on the surface 36 of the mould 21 (previously located on its lower side). Following this process, a predefined number of piles 26 must be placed according to the rigidity to be reached on the upper surface 7 and the lower surface 9 of the beam 3.

Then, and without moving supports 57, 58 and 59, resin laminates are placed on each of the side areas of the mould 21, which will support the two layers or cores of foam 16 on each side of the mould 21 and the unit is enveloped in an adhesive resin film.

After this, numerous piles 16 are once again placed, leaving a symmetrical configuration in relation to the cores of foam 16.

Figure 8:
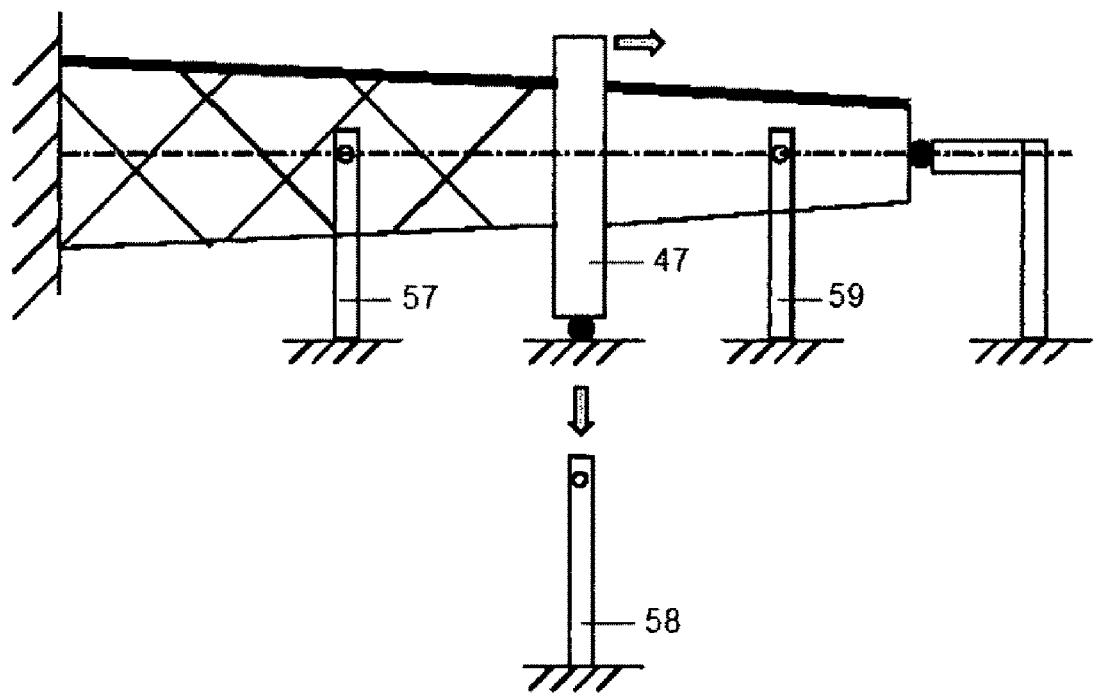
FIG. 8 shows a sketch of the winding machine application process.
Figure 9:
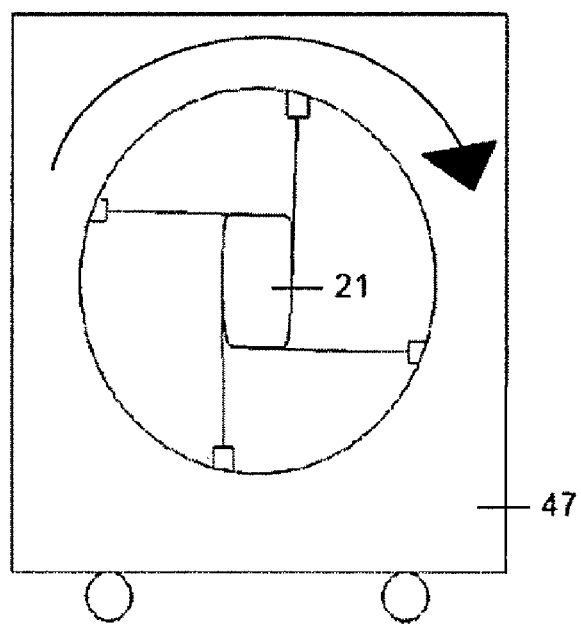
FIG. 9 shows a sketch of the fibre glass winding machine used in the performance of the manufacturing process of the structural beam of a wind turbine blade according to this invention.

As can be appreciated from FIGS. 5 and 8, in the winding process, the retractable supports 57, 58 and 59 are retracted when the winding machine 47 passes by in FIG. 9.

3. Preparing the Curing Process

Figure 10:
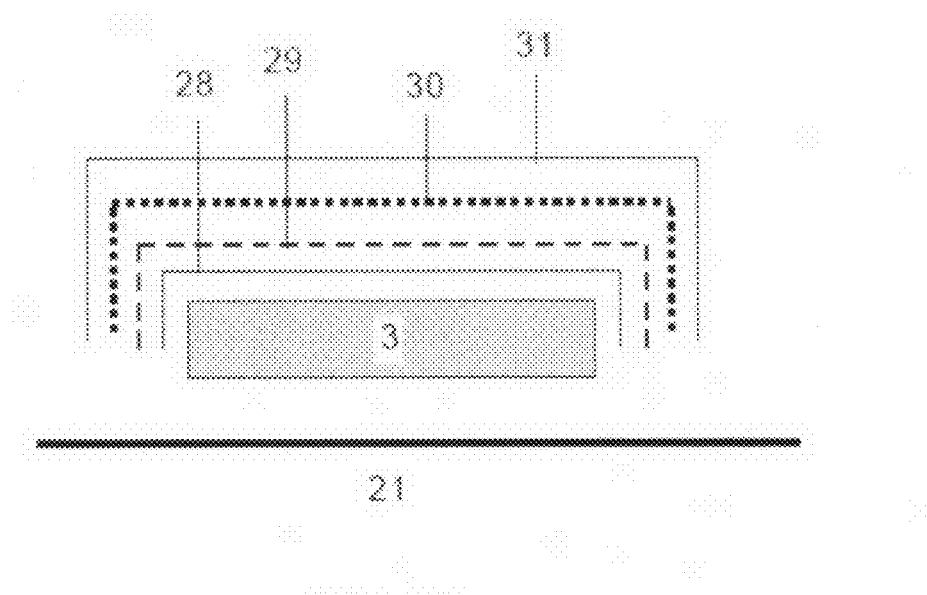
FIG. 10 shows the elements used in the curing process.

As seen in FIG. 10, the operation of preparing the curing process consists of completely covering the above mentioned beam 3 and mould 21 with a closed vacuum bag, 31, which is connected to a vacuum pump, reaching, for this particular embodiment of the invention, a vacuum pressure of between −0.7 and −0.8 bar, maintaining a minimum pressure of −0.7 bar during the complete curing process.

As seen in FIG. 10, a peel off film 28 and a vacuum bag 31 are placed over the beam 3, when the film is removed it will leave a clean and rough surface to facilitate the later adhesion of other elements (when forming the complete blade). This vacuum bag 31 encloses: an aerator 30, formed by a spongy material which allows air to pass through, thereby distributing the vacuum evenly on the laminate's surface; and a bleeder 29, formed by a perforated plastic film, with a particular hole density that facilitates the flow of resin towards the outside, eliminating the air content of the composite material laminate and equally eliminating any excess resin contained in the fibre as, except in exceptional cases, prepreg always contains excess resin.

4. Curing Process

Figure 11:
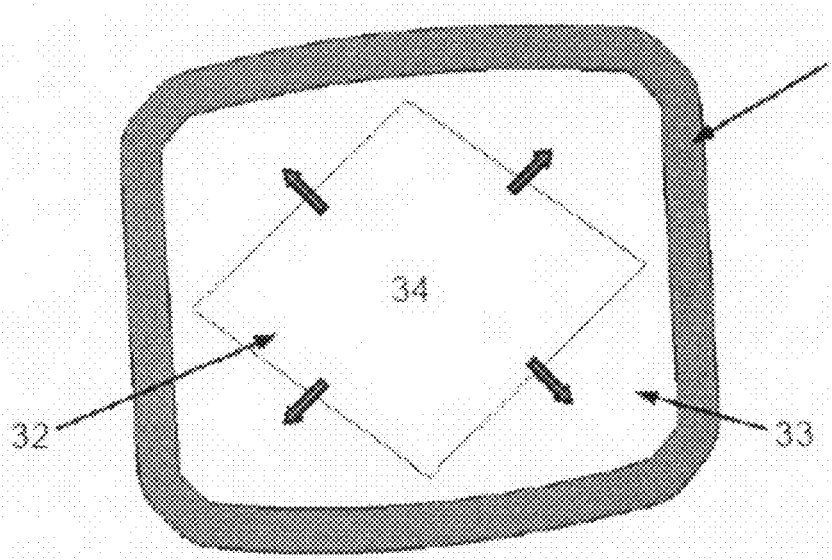
FIG. 11 shows a sketch of the hot air flow on the inside of the mould during the curing process.

As shown in FIG. 11, the curing process consists of drying the fabrics piled on the mould 21 during the lamination process, by applying a flow of hot air in order to obtain the definitive morphology of the beam 3.

Figure 4:
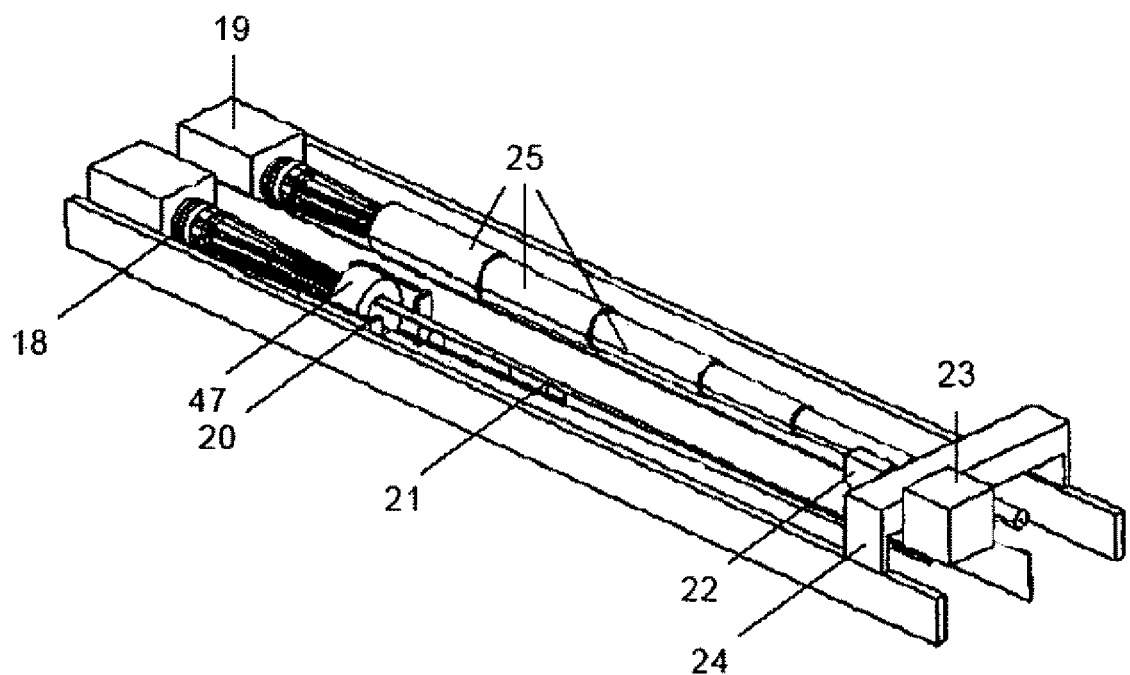
FIG. 4 shows a sketch of the components used in the performance of the manufacturing process of the structural beam of a wind turbine blade according to this invention.

Curing is carried out both from the outside, using air blown by the curing heaters 25 which appear in FIG. 4, and from the inside, as shown in FIG. 11.

The inside of the beam 3 is cured by using the internal channels of the mould 21, into which hot air is introduced 34—with the optimum flow, pressure and temperature setting for correct beam curing 3—from the heating system 19 of FIG. 3, via the impulsion pipe 32 of the mould 21. Said pipe is drilled so that the hot curing air passes to the extraction pipes 33.

During the curing process the beam 3 acquires its definitive form, it is therefore important to minimise any bending during this part of the process. To do so, the beam 3 is cured in a position in which the support of the mould 21 during the curing process is carried out by two levelling screws which are screwed to the supports, located in the areas of the mould designed for said purpose. These levelling screws are anchored to the curing heaters 25, on the inside.

5. Demoulding Process

The demoulding process consists of extracting the beam 1 after it has achieved its final morphology and mechanical properties. According to this particular embodiment of this invention, in order to demould, the curing heaters 25 must first be removed and slings attached to a bridge crane must then be placed. Then, the mould support at point 10 is removed.

The body 2 of the beam is fixed at the circular end part by a screwed joint with metal threaded inserts which are screwed to the demoulding or extraction system 18 so that, whilst the body 2 is fixed to a mobile flange, the mould 21 is fixed at the end 13 to a static flange. Then, by activating the hydraulics of the demoulding system 18 along the shaft of the mould 21, the finished beam 1 is expelled and the slings of the bridge crane accompany the movement. Once the beam 1 has been completely demoulded, it is taken to cooling stations (not shown) where the form is checked to ensure it is the form required.

To the preferred embodiment that has just been described, any modifications contained within the scope defined by the following claims may be applied.

The invention claimed is:

1. Structural beam (1) of a wind turbine blade made up of a first body or body-root (2) made from a composite material with a first part (4), near to the wind turbine hub, cylindrical in shape, a third part (6) in the shape of a box and a second part (5) with transitional shape between the first and third part, and a second body or body-trunk (3) in the shape of a box with a decreasing section towards the blade tip, characterised in that the body-trunk (3) is comprised of various piles (26) each one of them formed by various layers of carbon fibre impregnated with synthetic resin (14), situated on the upper areas (7) and lower areas (9), intercalating between various layers of fibre glass impregnated with synthetic resin (15) arranged along the perimeter, including between two piles (26) at least one layer of reinforcing material (16) on each of the side areas (11, 13) enveloped by an adhesive resin film.

2. Structural beam (1) of a wind turbine blade according to claim 1 characterised in that the aforementioned layers of carbon fibre impregnated with synthetic resin (14) are formed by numerous fabrics (49) of carbon fibre impregnated with synthetic resin arranged side by side, without overlapping, with the carbon fibres angled in the same direction as the shaft (12) of the beam (1).

3. Structural beam (1) of a wind turbine blade according to claim 1 characterised in that the aforementioned layers of fibre glass impregnated with synthetic resin (15) are formed by numerous fabrics (8) of fibre glass impregnated with synthetic resin arranged side by side, with an overlapping area between them, with the fibre glass angled at +/−45° in relation to the direction of the shaft (12) of the beam (1).

4. Procedure for the manufacture of a structural beam (1) of a wind turbine blade comprising a first body or body-root (2) made from a composite material with a first part (4), close to the wind turbine hub, cylindrical in shape, a third part (6) in the shape of a box and a second part (5) in a transitional shape between the first and second part, and a second body or body-trunk (3) in the form of a box with a decreasing section towards the tip of the blade, characterised in that it consists of the following stages:
  a) Preparation of a mould (21), with the hollow shape of the beam (1), provided with mechanisms for turning on its shaft and mechanisms for support on the floor consisting of some retractable supports (57, 58, 59) spaced in relation to the body of the mould (21) and an articulated support (10) at the end of the mould (21) which corresponds to the tip of the blade;
  b) Insertion of the body-root (2) into the mould (21) and built in fixture at the end of the mould (13) for fixing the first part of the body-root to the moulding system (18);
  c) Successive application to the mould (21) area relating to the body-trunk (3) of:
    various layers of fibre glass impregnated with synthetic resin (15) on the complete surface of the mould (21),
    various layers of carbon fibre impregnated with synthetic resin (14) on the upper part of the mould (21),
    various layers of fibre glass impregnated with synthetic resin (15) on the complete surface of the mould (21);
  d) 180° turn of the mould (21), after removing the retractable supports (57, 58, 59);
  e) Repetition of step c) with the lower side of the mould;
  f) Application of a layer of reinforcing material (16) on each of the side areas of the mould (21), after placing in these areas some resin sheets which fix them vertically and enveloping the unit with an adhesive, resin film;
  g) Repetition of steps c) and e) numerous times;
  h) Curing the beam (3) by applying hot air flow to the external surface of the beam and to the inside of the mould (21);
  i) Cooling to demoulding temperature, demoulding and cooling the beam to room temperature.

5. Procedure for the manufacture of a structural beam (1) of a wind turbine blade according to claim 4 characterised in that the mould (21) has a demoulding liquid treatment on its surface, in order to facilitate the beam (1) demoulding operation.

6. Procedure for the manufacture of a structural beam (1) of a wind turbine blade according to claim 4 characterised in that the retractable supports (57, 58, 59) of the mould (21) allow the winding machine (47) to pass, by retracting during the winding process.

7. Procedure for the manufacture of a structural beam (1) of a wind turbine blade according to claim 4 characterised in that the beam (3) and the mould (21) remain in a closed vacuum bag (31) connected to a vacuum pump during the preparation of the curing process, reaching internal vacuum pressure of between −0.7 and −0.8 bar, maintaining a minimum pressure of −0.7 bar throughout the curing process.

8. Procedure for the manufacture of a structural beam (1) of a wind turbine blade according to claim 4 characterised in that the inside of the body-trunk (3) area is cured by using the internal channels of the mould (21), into which hot air (34) is introduced via an impulsion pipe (32) of the mould (21), with said pipe being drilled in order for hot curing air to pass to the extraction pipes (33), heating the internal surface of the body-trunk (3).

9. Procedure for the manufacture of a structural beam (1) of a wind turbine blade according to claim 4 characterised in that the inside of the body-trunk (3) is cured in a position in which the support of the mould (21) is carried out using two levelling screws, located at areas of the mould designed for said purpose, with said levelling screws being anchored to curing heaters (25), on the inside.

10. Procedure for the manufacture of a structural beam (1) of a wind turbine blade according to claim 4 characterised in that the beam (1), once completely demoulded, is taken to cooling stations where it is checked to ensure that its form is the form required.

* * * * *